United States Patent
Kopton

(10) Patent No.: US 9,555,492 B2
(45) Date of Patent: Jan. 31, 2017

(54) BORING TOOL, PARTICULARLY A REAMER

(71) Applicant: AUDI AG, Ingolstadt (DE)

(72) Inventor: Peter Kopton, Kösching (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/774,221

(22) PCT Filed: Feb. 7, 2014

(86) PCT No.: PCT/EP2014/000347
§ 371 (c)(1),
(2) Date: Sep. 10, 2015

(87) PCT Pub. No.: WO2014/139620
PCT Pub. Date: Sep. 18, 2014

(65) Prior Publication Data
US 2016/0023290 A1  Jan. 28, 2016

(30) Foreign Application Priority Data
Mar. 11, 2013 (DE) .................. 10 2013 004 105

(51) Int. Cl.
*B23D 77/00* (2006.01)
*B23D 77/14* (2006.01)
*B23B 51/00* (2006.01)

(52) U.S. Cl.
CPC .............. *B23D 77/14* (2013.01); *B23D 77/00* (2013.01); *B23B 51/0018* (2013.01);
(Continued)

(58) Field of Classification Search
CPC ................. B23B 51/02; B23B 51/0018; B23B 2251/282; B23B 2251/285; B23D 77/00; B23D 77/14; B23D 2277/32; B23D 2277/72; Y10T 408/906; Y10T 408/909; Y10T 408/9097
See application file for complete search history.

(56) References Cited

U.S. PATENT DOCUMENTS 1,752,262 A *  3/1930  Muhlhoff ................ B23B 51/00
                                                            144/219
4,507,028 A     3/1985  Matsushita
(Continued)

FOREIGN PATENT DOCUMENTS

CN    101282809 A    10/2008
CN    102256734 A    11/2011
(Continued)

OTHER PUBLICATIONS

International Search Report issued by the European Patent Office in International Application PCT/EP2014/000347.
(Continued)

*Primary Examiner* — Daniel Howell
*Assistant Examiner* — Ryan Rufo
(74) *Attorney, Agent, or Firm* — Henry M. Feiereisen LLC

(57) ABSTRACT

A boring tool includes a clamping shaft and a boring body. Between the end face of the boring body and the clamping shaft, at least one main blade extends along a longitudinal axis of the boring body and includes a blade web with a rake face facing a groove-shaped chip space, and a free surface on the outer circumferential side, these converging at a cutting edge which runs along the boring body longitudinal axis and which removes material on an inner wall of a pre-bored workpiece core bore hole as a result of said boring tool being rotated. The main blade extending along the longitudinal axis of the boring body transitions at the end face, of the boring body into a groove blade that is aligned transversely to the longitudinal axis of the boring body. This groove blade allows the boring tool to be displaced, prior to
(Continued)

removing the material by rotation, into the core bore hole in an axial lifting motion such that a groove is formed which extends along the longitudinal axis of the core bore hole, the main blade of the boring tool engaging in this groove.

14 Claims, 6 Drawing Sheets

(52) U.S. Cl.
CPC .... *B23B 2251/285* (2013.01); *B23D 2277/32* (2013.01); *B23D 2277/36* (2013.01); *B23D 2277/60* (2013.01); *B23D 2277/72* (2013.01)

(56) References Cited

U.S. PATENT DOCUMENTS

| | | | |
|---|---|---|---|
| 2002/0102141 A1 | 8/2002 | Meece et al. | |
| 2005/0053438 A1* | 3/2005 | Wetzl | B23B 51/02 408/225 |
| 2005/0169721 A1* | 8/2005 | Schulte | B23D 77/00 408/227 |
| 2005/0249562 A1* | 11/2005 | Frejd | B23B 51/02 408/230 |
| 2006/0269372 A1* | 11/2006 | Goshima | B23B 51/02 408/230 |
| 2007/0134071 A1* | 6/2007 | Reinhardt | B23B 51/02 408/230 |
| 2008/0089753 A1* | 4/2008 | Takikawa | B23B 51/02 408/230 |
| 2008/0193234 A1* | 8/2008 | Davancens | B23B 35/00 408/1 R |
| 2009/0016832 A1* | 1/2009 | Onose | B23B 51/02 408/59 |
| 2009/0092452 A1* | 4/2009 | Sato | B23B 51/02 407/54 |
| 2010/0232898 A1* | 9/2010 | Friedrichs | B23B 51/02 408/144 |
| 2011/0085868 A1* | 4/2011 | Harouche | B23B 51/02 408/229 |
| 2011/0211924 A1* | 9/2011 | Yanagida | B23B 51/02 408/83 |
| 2013/0058734 A1* | 3/2013 | Volokh | B23B 51/08 408/223 |

FOREIGN PATENT DOCUMENTS

| | | |
|---|---|---|
| CN | 102649176 A | 8/2012 |
| DE | 38 05 729 | 8/1989 |
| DE | 10 2011 001 772 | 6/2012 |
| DE | 10 2011 015 879 | 10/2012 |
| EP | 2 522 451 | 11/2012 |
| JP | 4565492 | 10/2010 |

OTHER PUBLICATIONS

Chinese Search Report issued by the Chinese Patent Office in Chinese Application No. 2014800137695 on Apr. 13, 2016.
Translation of Chinese Search Report issued by the Chinese Patent Office in Chinese Application No. 2014800137695 on Apr. 13, 2016.

* cited by examiner

BORING TOOL, PARTICULARLY A REAMER

CROSS-REFERENCES TO RELATED APPLICATIONS

This application is the U.S. National Stage of International Application No. PCT/EP2014/000347, filed Feb. 7, 2014, which designated the United States and has been published as International Publication No. WO 2014/139620 and which claims the priority of German Patent Application, Serial No. 10 2013 004 105.8, filed Mar. 11, 2013, pursuant to 35 U.S.C. 119(a)-(d).

BACKGROUND OF THE INVENTION

The invention relates to a boring tool, in particular a reamer and a method for surface processing of an inner walling of a pre-drilled core bore of a workpiece.

Such a boring tool is used in vehicle construction for example during production of a cylinder-head bore, namely for fine processing of the inner wall of the cylinder-head bore, which improves the surface quality and the shape and dimensional accuracy of the bore.

From DE 38 05 729 A1 a generic boring and reaming tool is known, which has a clamping shank and a boring body. Between the end face of the boring body and the clamping shank three main blades extend helically along a longitudinal axis of the boring body. Each of these main blades has a blade web, which has a rake face which faces a groove-shaped chip space and a free surface on an outer circumference. The rake face and the free surface converge at a cutting edge which extends along the longitudinal axis of the boring body, and with which material can be removed from the inner walling of a predrilled core bore of a work-piece when the boring tool rotates.

By means of the reamer known from DE 38 05 729 A1 the surface processing of an already predrilled cylinder head core bore is performed as follows: first the reaming tool is brought to a very high rotational speed (for example in the range from 10,000 to 15,000 rpm). Subsequently at this high rotational speed the rotating reaming tool is inserted into and moved out of the cylinder head core bore with an axial movement. Depending on the dimensioning of the cylinder head core bore to be processed, the time required for the surface processing is within a range of for example one second, which especially in the case of large-scale serial production is a relatively long period of time.

SUMMARY OF THE INVENTION

The object of the invention is to provide a method for surface processing of an inner wall of a pre-drilled workpiece core bore and a boring tool for such a surface processing, which requires less energy and/or time while at the same time providing the same surface quality.

The object is solved by a boring tool, in particular reamer, including a clamping shank and a boring body, wherein the boring body has at least one main blade which extends between an end face of the boring body and the clamping shank along a longitudinal axis of the boring body, wherein the at least one main blade has a blade web, wherein the blade web has a rake face facing toward a groove-shaped chip space of the boring body and a free surface arranged on an outer circumference of the boring body, the rake face and the free surface converging at a cutting edge of the at least one main blade, the cutting edge extending along the longitudinal axis of the boring body, wherein the main blade transitions at the end face of the boring body into a groove blade oriented transverse to the longitudinal axis of the boring body, wherein the groove blade is configured to form a groove in an inner wall of a predrilled core bore of a workpiece during a movement of the boring tool into the pre-drilled core bore along a longitudinal axis of the core bore, said groove extending along the longitudinal axis of the core bore, wherein the main blade is configured to engage in the groove and to cause a material removal on the inner wall of the pre-drilled core bore of the work-piece as a result of a rotation of the boring tool, and a method for surface processing of an inner wall of a pre-drilled core bore of a work piece, including in a pre-processing step forming with a boring tool a groove the inner wall of the core bore which extends along the longitudinal axis of the core bore; and in a final processing step engaging a main blade of the boring tool in the groove and removing the material with the main blade by rotating the boring tool. Preferred refinements of the invention are disclosed in the dependent claims.

The invention is based on the fact that with the boring tools known from the state of the art the circumferential material removal on the inner walling of the core bore is performed with very high rotational speeds and an axial movement into the core bore which is superimposed on the rotational movement, which is time and energy intensive. Before this background, according to the characterizing portion of patent claim 1 a boring tool is provided which in addition to the main blade extending along the longitudinal axis of the boring body (which causes the material removal on the inner walling of the core bore during rotation of the boring tool), has a groove blade. The groove blade is oriented transversely to the longitudinal axis of the boring body and arranged on the end face of the boring body.

With such a boring tool the surface processing can be performed in two processing steps: in a first processing step first a groove extending along the core bore axis is formed in the inner wall of the core bore. The groove in the inner wall of the core bore is formed by a straight axial movement of the boring tool into the core bore. As an alternative the groove can also be formed helically. In this case the boring tool is moved in a "thread-drilling mode" into the core bore at low rotational speed. In this state, i.e., when inserted into the core bore, the main blade of the boring tool, which is responsible for the circumferential material removal, can already be in full engagement with the groove, i.e., can be arranged over the entire processing length in the groove.

In a subsequent second final processing step the main blade of the boring tool can remove the material while the boring tool is rotating, however without axial forward feed. The above final processing step—in contrast to the state of the art—does not require a high rotational speed is, but (due to the absent axial forward feed) only a low rotational speed. For example in the case of two mirror-symmetrically configured main blades which are diametrically opposed with regard to the longitudinal axis of the boring body, only at least one half revolution of the boring tool is required. Subsequently the boring tool can be moved out of the surface-processed core bore. In this way the surface processing is significantly more energy efficient and takes much less time.

The pre-processing step as well as the final processing step can be performed without tool change, i.e., using the same boring tool. As an alternative, the pre-processing step and the final processing step can be performed with a tool change, i.e., using different boring tools.

As mentioned, in the pre-processing step the at least one helical groove is generated in the inner walling of the core bore in a thread-drilling mode. This means that when generating the helical groove the boring tool is moved into the cylindrical core bore with an axial forward feed speed while rotating about its longitudinal axis (depending on the pitch of the helical groove) of the boring body, in such a manner that a continuous helical groove path results and the main blade is engaged in the helical groove.

The groove introduced into the inner wall of the core bore in the pre-processing step has a groove depth, which corresponds to the material thickness to be removed in the subsequent final processing step. In particular, the pre-processing step and the final processing step can both be performed by the same boring tool according to the invention. As an alternative the groove depth can be greater than the material thickness to be removed. In this case the groove remains on the inner walling of the core bore also in the finished state. Depending on the application of the workpiece, such a grove may for example also function as a ventilation channel.

In the following the specific geometry of the blade of the boring tool according to the invention is described: The groove blade can have a groove-base cutting edge, which converges with the main cutting edge at a first blade corner. In addition the free surface of the blade web situated on the outer circumference and a groove-chip rake face can converge at the groove-base cutting edge. The groove-chip rake face presses the groove-chips produced during the pre-processing step into the groove-shaped chip space, which extends along the longitudinal axis of the boring body from where it is further guided in the direction out of the core bore.

The groove-chip rake face is delimited by the mentioned groove cutting edge and also by first and second groove flank cutting corners. These respectively transition at the first blade corner and at a second blade corner into the groove-base cutting edge. At the first cutting corner thus the main cutting edge, the first groove flank cutting edge and the groove-base cutting edge converge together.

With regard to the reduced mechanical stress on the drilling device that drives the boring tool it is preferred when the groove is not introduced straight but helically into the inner walling of the core bore in the pre-processing step. Correspondingly, also the main blade extends with an angle of twist helically about the longitudinal axis of the boring body. In this case the groove is cut into the inner walling of the core bore (i.e., in the thread-drilling mode) with the translational stroke movement and also with a rotational movement of the boring tool, which rotational movement is adjusted to the angle of twist.

For a proper removal of the groove-chip it is preferred when the groove cutting edge is positioned obliquely with a predetermined angle of attack relative to a plane, which is perpendicular to the longitudinal axis of the boring body. The angle of attack is preferably dimensioned so that when viewed in the direction of rotation the leading first cutting corner is spaced apart from the end face of the boring body by a longitudinal offset, which is greater than the longitudinal offset of the second blade corner. Optionally the second blade corner can end flush with the, preferably flat, end face of the boring body.

With regard to a proper surface processing it is important that the groove-chip produced during the pre-processing step is reliably removed from the core bore. For such a reliable removal of the groove-chip, the groove-chip rake face of the groove cutting edge can be extended radially inwardly with a chip-guiding surface. Via the chip-guiding surface the groove-chip produced during cutting of the groove can be easily pushed into the chip space extending along the longitudinal axis of the boring body. The chip-guiding surface is preferably also arranged slanted between the end face of the boring body and the chip space, in particular at the angle of attack mentioned above.

In a constructive embodiment, the chip-guiding surface, which extends the groove-chip rake face radially inwardly, can be formed by a corner recess at the transition between the end face of the boring body and the chip space.

For further supporting the removal of the groove-chip, a radially outwardly protruding peripheral web can be formed on the end face of the boring body. The peripheral web can close the groove-shaped chip space, which extends along the longitudinal axis of the boring body. This reliably prevents that groove-chip is displaced directly between the end face of the boring body and the core bore.

The main blade can protrude past the radially protruding peripheral web on the end face by a predetermined radial offset. In addition the substantially circumferential peripheral web can be interrupted by the above-mentioned corner recess in order to ensure an improved disposal of the groove-chip into the chip space.

The disposal of the chip, the lubrication and/or cooling can be supported by using coolant, air, oil, a minimal quantity lubrication or by other media which are guided out of a coolant outlet into the chip space with high pressure for example in the region of the end face of the boring tool and flush the chip out of the bore. For supplying the boring tool with such media the boring tool can have at least one central medium line from which several medium channels branch off. The medium channels can for example lead into the longitudinally extending chip space.

As mentioned above, one or multiple main blades can be formed on the boring body. For example at least one first main blade and a second main blade can be distributed over the circumference on the boring body. The first main blade and the second main blade can each be engaged after the pre-processing step in the respective inner wall groove of the core bore. The two main blades can hereby extend over the entire length of the groove.

As an alternative, the two main blades may not extend over the entire groove length but—preferably with a small overlap—each extend only over a first partial groove length and a second partial groove length. This enables reducing the torque load acting on the main blades.

The advantageous embodiments or refinements of the invention mentioned above and/or set forth in the dependent claims can be used individually or in any desired combination with each other—except in cases of clear dependencies or irreconcilable alternatives.

BRIEF DESCRIPTION OF THE DRAWING

In the following, the invention and its advantageous embodiments and refinements and its advantages are explained by way of drawings.

It is shown in.

DETAILED DESCRIPTION OF PREFERRED EMBODIMENTS

Figure 1:
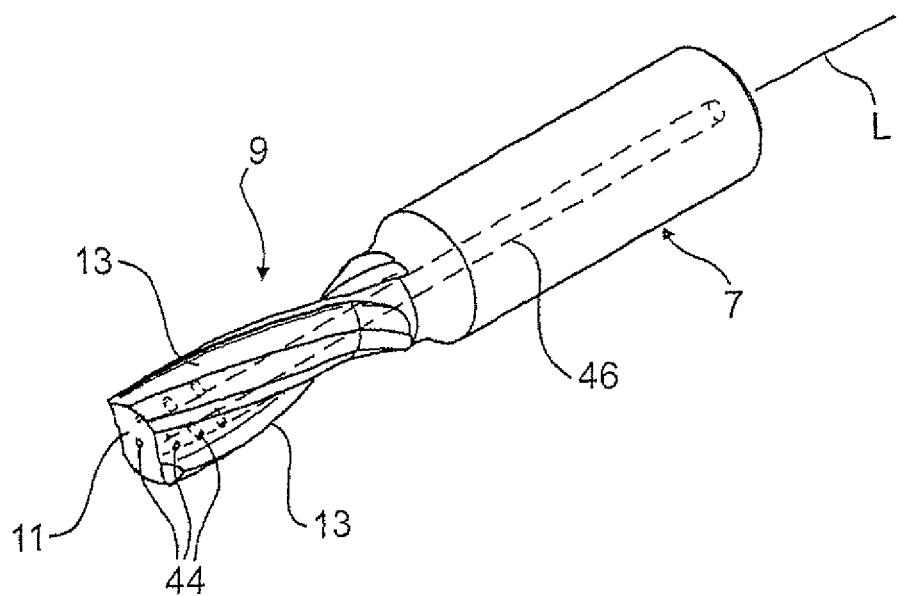
FIG. 1 a perspective view of a boring tool according to a first exemplary embodiment.
Figure 2:
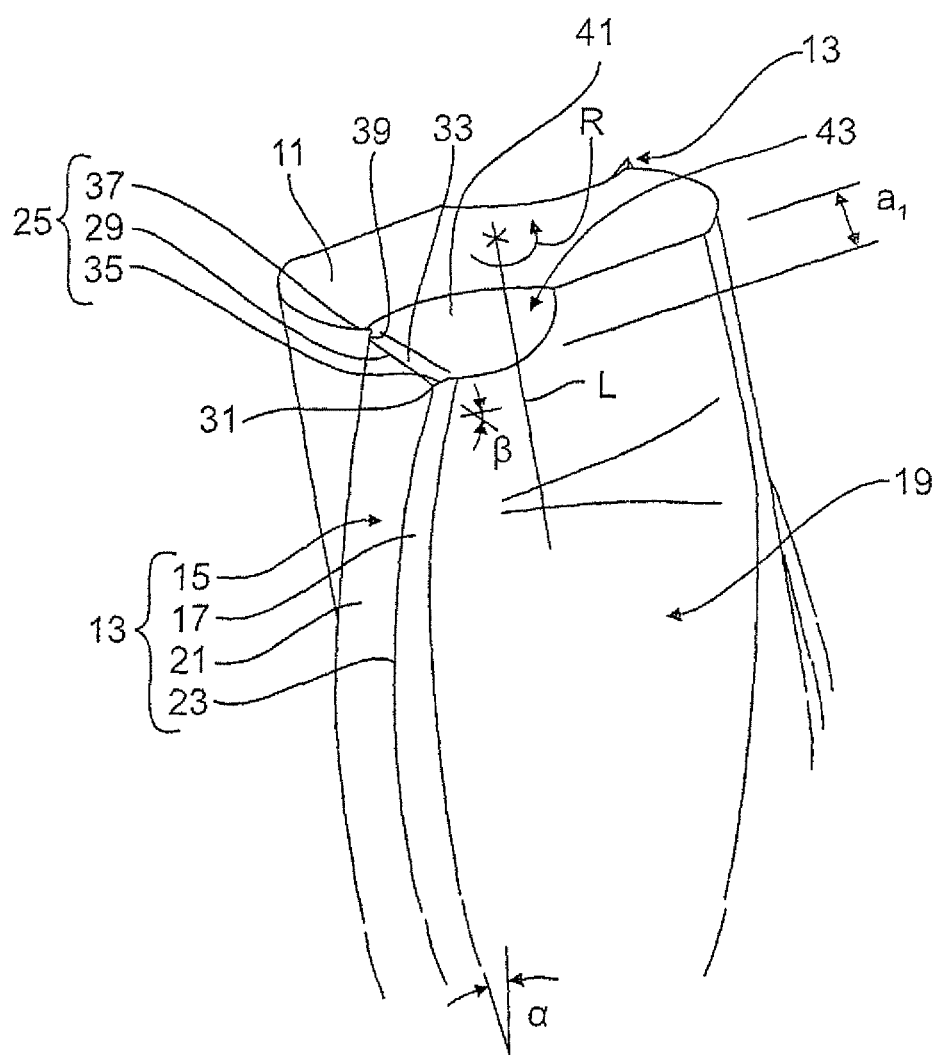
FIG. 2 an enlarged perspective view of the end face of the boring tool.

FIG. 1 shows a boring tool for surface processing of an inner wall 1 of a core bore 3 of a workpiece 5, which inner wall is shown below in FIGS. 7 and 8. The boring tool has a clamping shank 7 for fastening in a not shown drill chuck of a drilling device, and a boring body 9 adjoining the clamping shank. Extending between the flat end face 11 of the boring body and the clamping shank 7 are two main blades 13, which are diametrically opposed with regard to a longitudinal axis L of the boring body and which are configured mirror symmetrical to each other. The two main blades 13 extend with an angle of twist α (FIG. 2) helically about the longitudinal axis L of the boring body. In addition each main blade 13 has a radially outwardly protruding blade web 15 (FIG. 2). The latter has a rake face 17, which faces a respective groove-shaped chip space 19 and a free surface 21 on an outer circumference. The rake face 17 and the free surface 21 of the blade web 15 on the outer circumference converge at a cutting edge 23 which extends along the longitudinal axis L of the boring body. When the boring tool rotates, a circumferential material removal is accomplished by means of this cutting edge 23 as later described in FIGS. 7 and 8 over a material thickness m (FIG. 7) on the inner wall 1 of the pre-drilled core bore 3 of the workpiece.

In addition each main blade 13 that extends along the longitudinal axis L of the boring body transitions at the end face 11 of the boring body into a grove blade 25, which is oriented transverse to the boring body longitudinal axis L. In a later described processing step I the boring tool can be moved into the core bore 3 by means of the groove blade 25 while in a thread-drilling mode, i.e., with a translational stroke movement h (FIG. 7), and an adjusted very low rotational speed n (FIG. 7). This results in the diametrically opposed helical grooves 27 shown in FIG. 7 which extend helically along the longitudinal axis L of the core bore.

As further shown in FIG. 2, the groove blade 25 has a groove-base cutting edge 29. The groove-base cutting edge 29 converges with the main cutting edge 23 at a first blade corner 31. In addition, also the circumference-side free surface 21 of the blade web 15 and an end-face-side groove-chip rake face 33 converge at the groove-base cutting edge 29. According to FIG. 2, the groove base chip rake face 33 is delimited by the groove-base cutting edge 29 and by a first groove flank cutting edge 35 and a second groove flank cutting edge 37. The first groove flank cutting edge 35 transitions at the mentioned blade corner 31 into the groove-base cutting edge 29, while the second groove flank cutting edge 37 transitions at a second blade corner 39 (FIG. 2) into the groove-base cutting edge 29.

As can be further seen from the Figures, the groove-base cutting edge 29 is positioned slanted at an angle of attack β relative to a plane that is perpendicular to the longitudinal axis L of the boring body. The angle of attack β is about 45 and is selected so that when viewed in the direction of rotation R the leading first blade corner 31 is spaced apart from the end face 11 of the boring body by a longitudinal offset $a_1$. The second trailing blade corner 39 is oriented to end flush (i.e., without longitudinal offset) with the flat end face 11 of the boring body or may be spaced apart from the end face of the boring body by a further not shown longitudinal offset $a_2$, which however is smaller than the longitudinal offset $a_1$ of the first blade corner 31.

The above-mentioned groove-chip rake face 33 of the groove blade 25 is extended radially inwardly with a chip-guiding surface 41. By means of the chip-guiding surface 41 the groove-chip generated during the cutting of the groove is pushed into the chip space 19 extending along the longitudinal axis L of the boring body. The chip-guiding surface 41 is also arranged slanted between the end face 11 of the boring body and the chip space 19 at an angle of attack β.

As shown in the Figures the chip-guiding surface 41 is formed by a corner recess 43 at the transition between the end face 11 of the boring body and the chip space 19.

The chip disposal, the lubrication and/or the cooling is supported by using for example a coolant or another medium which is guided under high pressure out of coolant outlets 44 (FIG. 1) in the end face 11 of the boring body and in the region of the chip space 19, in order to move the chips out of the core bore 3. For supplying the boring tool with coolant the boring tool has for example a central coolant line 46 from which coolant outlets 44 branch off.

Figure 3:
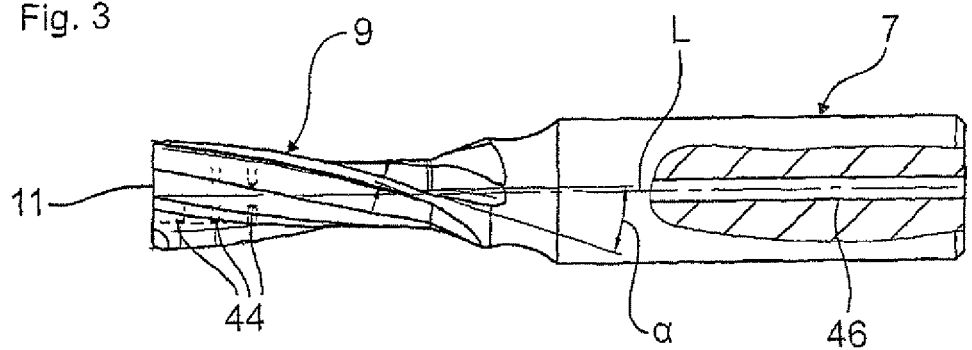
FIGS. 3 and 4 respective side views of different exemplary embodiments of the boring tool according to the invention.
Figure 4:
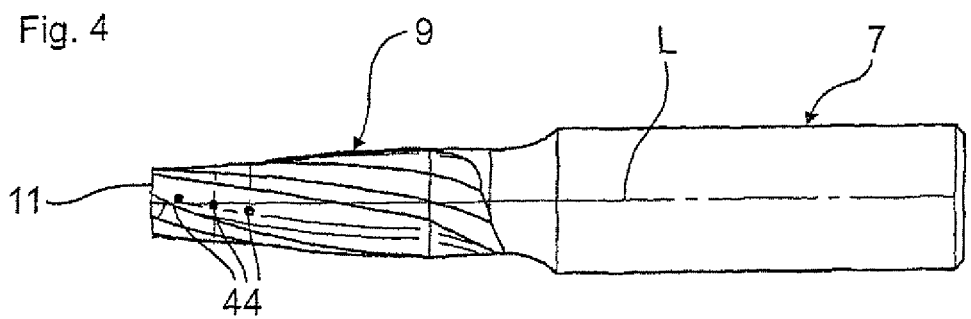

FIGS. 3 and 4 show further embodiments of the boring tool. In contrast to FIGS. 1 and 2, in FIG. 3 an imaginary envelope curve of the main blades 13 is not cylindrical, but rather conically widened in the direction toward the end face 11 of the boring body. In contrast, in FIG. 4 the envelope curve of the main blades 13 is conically widened in the direction toward the clamping shank 7.

Figure 5:
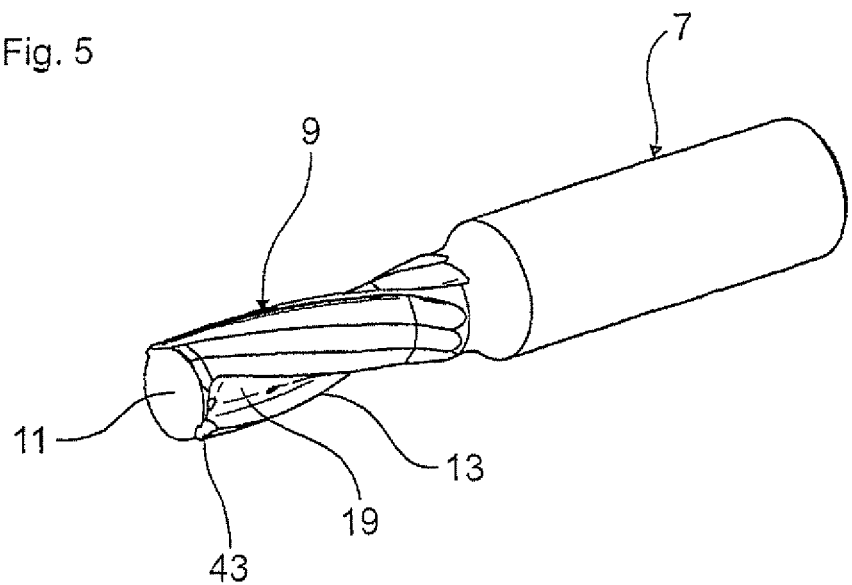
FIGS. 5 and 6 respective views of a boring tool according to a further exemplary embodiment.
Figure 6:
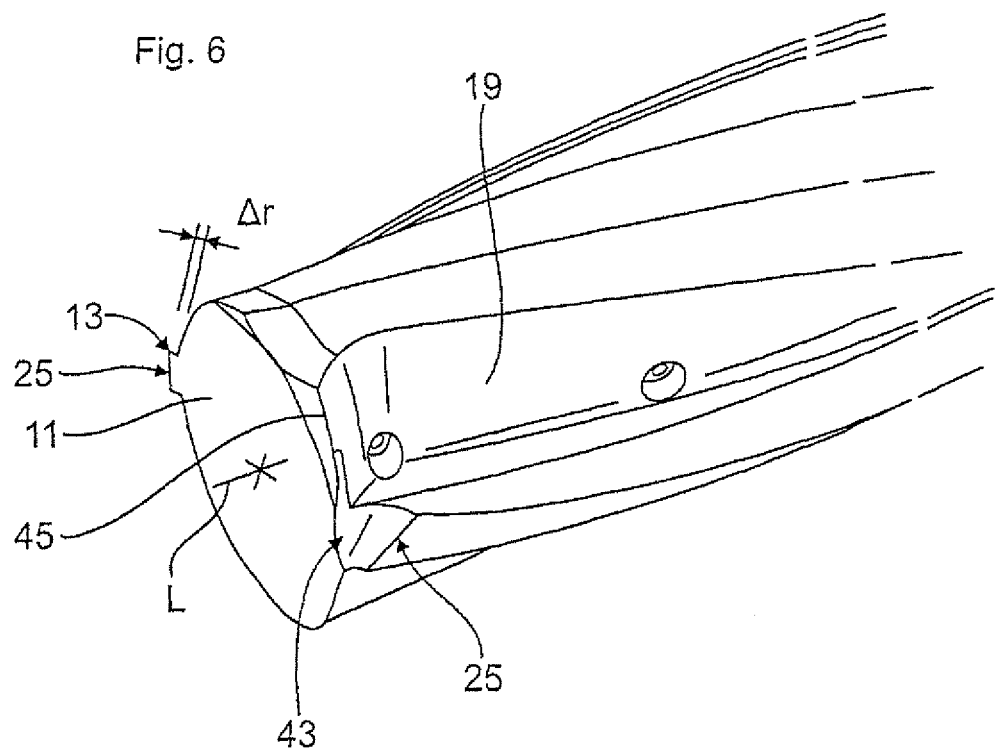

In the following FIGS. 5 and 6, the boring tool is shown according to a further exemplary embodiment, wherein its general construction and functioning is identical to the construction and functioning of the preceding exemplary embodiments. In contrast to the preceding exemplary embodiments the boring tool shown in FIGS. 5 and 6 has a peripheral web 45 on the end face 11 of the boring body, which protrudes radially outwardly. The peripheral web 45 closes the groove-shaped chip space 19, which extends along the longitudinal axis L of the boring body. In addition the peripheral web 45 is dimensioned so that the two main blades 13 protrude over the peripheral web 45 by a radial offset Δr. The substantially circumferential peripheral web 45 is in addition interrupted by the two corner recesses 43, in order to ensure a proper disposal of the groove-chip.

Figure 7:
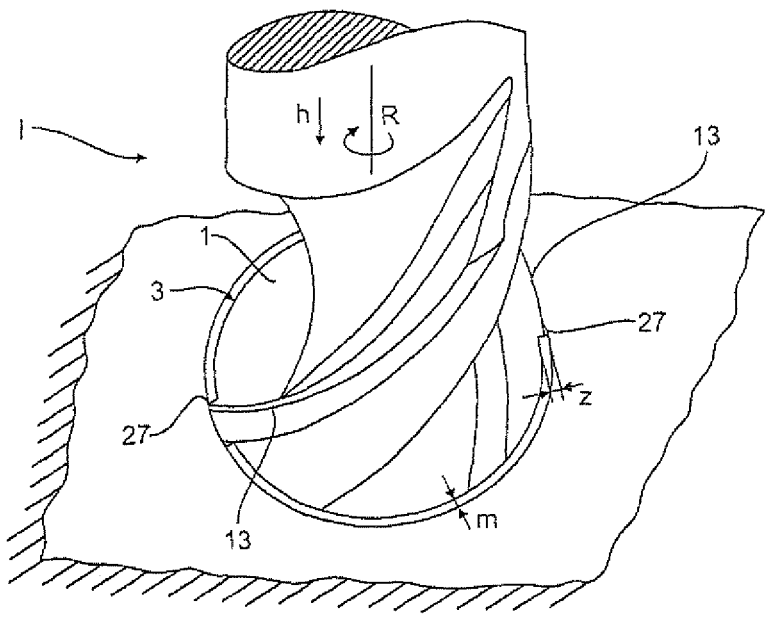
FIGS. 7 and 8 respective views, which show a pre-processing step and a final processing step during the surface processing of the inner wall of the pre-drilled core bore of the workpiece.
Figure 8:
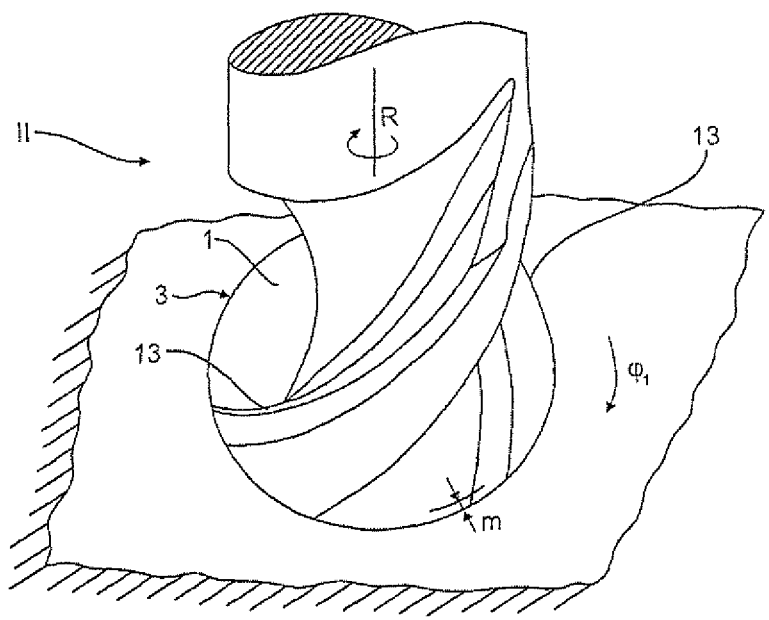

FIGS. 7 and 8 illustrate the method for surface processing. According to this in a first pre-processing step I in a thread-drilling mode, i.e., at low rotational speed and axial feed movement h adjusted to the rotation speed, the boring tool is first inserted into the pre-drilled core bore 3 of the work piece. For this the opposing helical grooves 27 are formed. The groove depth t of the two grooves 27 corresponds to the material thickness to be removed in the subsequent final processing step 2.

After forming the two helical grooves 27 the boring tool remains in its inserted state shown in FIG. 7, in which also the two main blades 13 are in engagement with the helical grooves 37.

In the subsequent final processing step II (FIG. 8) the boring tool is then rotated with at least half a revolution (i.e., at least a rotation angle φ of 180°), which allows the two main blades 13 to perform the intended material removal. Subsequently the boring tool is removed again from the now finished processed bore.

In the above exemplary embodiment of FIGS. 7 and 8 each of the two main blades 13 is in engagement with the respective groove 27 after the pre-processing step I, namely continuously over the entire groove length l. As a result each of the main blades 13 is subjected to a great torque in the subsequent final processing step II.

Figure 9:
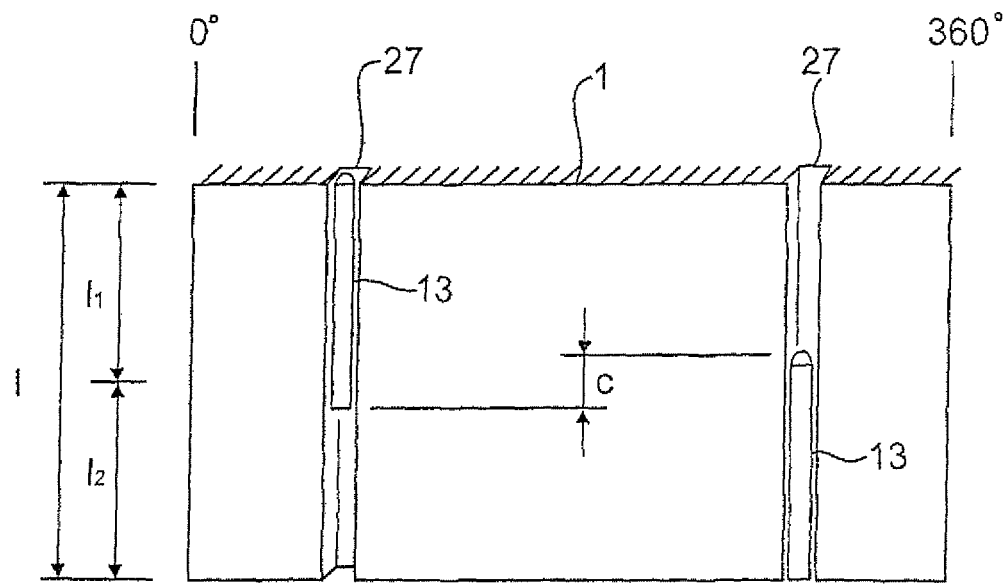
FIG. 9 a developed view of the inner wall of the core bore with the grooves worked into it, with which main blades of the boring tool, which are indicated with dashed lines, are in engagement.

For reducing this torque load, the arrangement of the main blades 13 on the boring tool can be adjusted as shown in FIG. 9. In FIG. 9 the inner wall 1 of the core bore is shown in a developed view. In the developed view, for reasons of simplicity, the two grooves 27 do not extend helically but straight. Each of the two grooves 27 is in engagement with a main blade 13 (shown in dashed lines) of the boring tool. In contrast to FIGS. 7 and 8, however, the two main blades 13 do not extend over the entire groove length l, but only over the partial lengths $l_1$, $l_2$, i.e., with a slight overlap c. In the subsequent final processing step II the boring tool no longer has to be rotated about a rotation angle $\phi_1$ of 180° (as in FIG. 8) but at least by a rotation angle $\phi_2$ of 360°.

Figure 10:
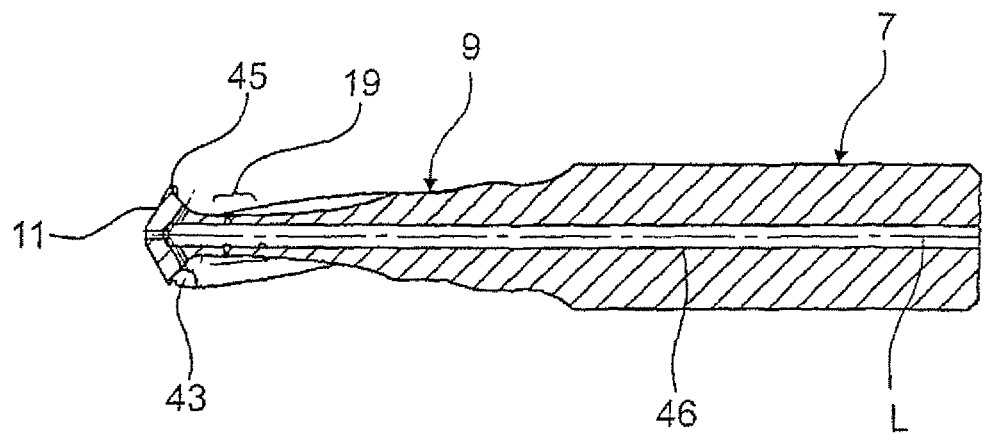
FIG. 10 a side view of a boring tool according to a further exemplary embodiment.

FIG. 10 shows the boring tool according to a further exemplary embodiment, wherein its general construction and functioning is identical to the construction and functioning of the preceding exemplary embodiments. In contrast to the preceding exemplary embodiments the boring tool shown in FIG. 10 is not configured flat on the end face 11 of the boring body but is configured with a conical tip, which transitions into the outwardly protruding peripheral web 45. The peripheral web 45 closes the chip space 19, which extends along the longitudinal axis L of the boring body.

What is claimed is:

1. A boring tool, comprising:
    a clamping shank; and
    a boring body, said boring body having at least one main blade which extends between an end face of the boring body and the clamping shank along a longitudinal axis of the boring body, said at least one main blade having a blade web, said blade web having a rake face facing toward a groove-shaped chip space of the boring body and a free surface arranged on an outer circumference of the boring body, said rake face and said free surface converging at a cutting edge of the at least one main blade, said cutting edge extending along the longitudinal axis of the boring body,
    said main blade transitioning at the end face of the boring body into a groove blade having a groove-chip rake face, said groove blade oriented transverse to the longitudinal axis of the boring body,
    said groove blade being configured to form a groove in an inner wall of a predrilled core bore of a workpiece during a movement of the boring tool into the pre-drilled core bore along a longitudinal axis of the core bore, said groove extending along the longitudinal axis of the core bore,
    said main blade being configured to engage in said groove and to cause a material removal on the inner wall of the pre-drilled core bore of the work-piece as a result of a rotation of the boring tool,
    wherein the groove blade has a groove-base cutting edge which at a first blade corner of the main blade converges with the main cutting edge of the main blade,
    wherein the free surface of the blade web and the groove-chip rake face converge at the groove-base cutting edge,
    wherein the groove-chip rake face is delimited by the groove-base cutting edge and by a first and a second groove-flank cutting edge of the groove blade, each said first and second groove-flank cutting edge transitioning at the first blade corner and at a second blade corner of the main blade into the groove-base cutting edge.

2. The boring tool of claim 1, wherein the main blade extends with its blade web helically about the longitudinal axis of the boring body at an angle of twist.

3. The boring tool of claim 2, wherein the boring tool is configured so that the groove is formed helically into the inner wall of the core bore by the axial movement in combination with a rotational movement of the boring tool that is adjusted to the angle of twist.

4. The boring tool of claim 1, wherein the groove base cutting edge is positioned slanted at an angle of attack relative to a plane which is perpendicular to the longitudinal axis of the boring body.

5. The boring tool of claim 4, wherein the groove-base cutting edge is positioned so that when viewed in a direction of rotation of the boring tool a leading one of the first and second blade corners is spaced apart from the end face of the boring body by a first longitudinal offset, and a trailing one of the first and second blade corners is spaced apart from the end face of the boring body by a second offset, said first offset being greater that the second offset.

6. The boring tool of claim 4, wherein the rake face of the groove blade is extended radially inwardly by a chip-guiding surface which pushes chips generated during cutting of the groove into the chip space.

7. The boring tool of claim 6, wherein the chip-guiding surface is arranged in a slanted position and connects the end face of the boring body with the chip space.

8. The boring tool of claim 7, wherein the chip-guiding surface is arranged at the angle of attack.

9. The boring tool of claim 6, wherein the chip-guiding surface is formed by a corner recess at a transition between the end face of the boring body and the blade web.

10. The boring tool of claim 9, wherein a radially outwardly protruding peripheral web is formed along a circumference of the end face of the boring body, said peripheral web closing the groove-shaped chip space.

11. The boring tool of claim 10, wherein the main blade protrudes over the peripheral web by a radial offset.

12. The boring tool of claim 11, wherein the peripheral web is interrupted along the circumference by the corner recess.

13. The boring tool of claim 1, wherein the boring body has at least two said at least one main blade, said at least two main blades being distributed over a circumference of the boring body, and being engageable with a respective groove, wherein the at least two main blades each respectively extend over a first partial groove length and a second partial groove length.

14. The boring tool of claim 13, wherein the at least two main blades extend over the first partial groove length and the second partial groove length with a slight overlap.

* * * * *